(12) United States Patent
Mei et al.

(10) Patent No.: US 12,299,589 B2
(45) Date of Patent: May 13, 2025

(54) DISCOVERING NEW QUESTION AND ANSWER KNOWLEDGE FROM CONVERSATION

(71) Applicant: International Business Machines Corporation, Armonk, NY (US)

(72) Inventors: Lijun Mei, Beijing (CN); Qi Cheng Li, Beijing (CN); Xue Han, Beijing (CN); Xin Zhou, Beijing (CN); Zi Ming Huang, Beijing (CN); Ya Bin Dang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 988 days.

(21) Appl. No.: 17/363,249

(22) Filed: Jun. 30, 2021

(65) Prior Publication Data

US 2023/0004823 A1 Jan. 5, 2023

(51) Int. Cl.
| | |
|---|---|
| G06N 5/022 | (2023.01) |
| G06F 16/3329 | (2025.01) |
| G06F 16/9032 | (2019.01) |
| G06F 40/30 | (2020.01) |
| G06N 20/00 | (2019.01) |

(52) U.S. Cl.
CPC ......... G06N 5/022 (2013.01); G06F 16/3329 (2019.01); G06F 16/90332 (2019.01); G06F 40/30 (2020.01); G06N 20/00 (2019.01)

(58) Field of Classification Search
CPC .. G06N 5/022; G06N 20/00; G06F 16/90332; G06F 16/3329; G06F 40/30
See application file for complete search history.

(56) References Cited

U.S. PATENT DOCUMENTS

| | | | |
|---|---|---|---|
| 8,983,962 B2 | 3/2015 | Nakazawa et al. | |
| 9,043,197 B1 * | 5/2015 | Pasca | G06F 40/284 |
| | | | 704/10 |
| 10,031,952 B2 | 7/2018 | Bastide et al. | |

FOREIGN PATENT DOCUMENTS

CN 110990546 A 4/2020

OTHER PUBLICATIONS

Anonymous, "A method to detect pattern in documents and add annotation to documents to implement intelligent question and answer system", An IP.com Pr or Art Database Technical Disclosure, IP.com No. IPCOM000236999D, IP.com, Electronic Publication Date May 26, 2014, 7 pages.

(Continued)

*Primary Examiner* — Sonia L Gay
(74) *Attorney, Agent, or Firm* — Scully, Scott, Murphy & Presser, P.C.; Anthony Mauricio Pallone

(57) ABSTRACT

New question and answer (QA) pairs can be automatically discovered from a corpus of data such as online chats and conversations. Newly discovered QA pairs can augment QA database, which can be used by a computer processor or device, e.g., by a chatbot, an automated machine, and/or another. Existing QA knowledge can be used to learn the structures of QA knowledge distribution in conversations, and new QA knowledge can be automatically learned through the structure of learned QA knowledge distribution in conversations. The structure of learned QA knowledge distribution can be refined by adding more semantics based on labeled data.

20 Claims, 7 Drawing Sheets

(56) References Cited

OTHER PUBLICATIONS

Cui, W., et al., "KBQA: Learning Question Answering over QA Corpora and Knowledge Bases", Proceedings of the VLDB Endowment, Jan. 2017, pp. 565-576, vol. 10, No. 5.
NIST, "NIST Cloud Computing Program", http://csrc.nist.gov/groups/SNS/cloud-computing/index.html, Created Dec. 1, 2016, Updated Oct. 6, 2017, 9 pages.

* cited by examiner

DISCOVERING NEW QUESTION AND ANSWER KNOWLEDGE FROM CONVERSATION

BACKGROUND

The present application relates generally to computers and computer applications, and more particularly to natural language processing and discovering new question and answer knowledge from conversations, and automated processor or robot that can carry on a conversation with a user.

A computer, e.g., such as one running a chatbot can conduct an on-line chat conversation, for example, by text or speech, with a user. Such a computer and/or chatbot may access or learn from existing conversations, for example, dialogs including questions and answers, to continue to tune and test, to improve itself. For instance, a chatbot that provides customer care experiences may need to recognize and follow various goal-driven patterns in conversations in servicing a customer.

BRIEF SUMMARY

The summary of the disclosure is given to aid understanding of a computer system and method of discovering new question and answer knowledge from conversations, and not with an intent to limit the disclosure or the invention. It should be understood that various aspects and features of the disclosure may advantageously be used separately in some instances, or in combination with other aspects and features of the disclosure in other instances. Accordingly, variations and modifications may be made to the computer system and/or their method of operation to achieve different effects.

A system of discovering new question and answer knowledge from conversation, in an aspect, can include a processor and a memory device coupled with the processor. The processor can be configured to receive a question and answer pair including a question and a corresponding answer. The processor can also be configured to search a corpus of conversations to find first conversation segments containing the question and answer pair, the conversation segments containing statements including the question, the answer and intermediate statements in-between the question and the corresponding answer. The processor can also be configured to tag the statements in the first conversation segments with dialog labels. For example, the first conversation segments can be transformed into sequences of dialog labels, a sequence of dialog labels representing a question and answer structure pattern of a first conversation segment, where question and answer structure patterns are formed respectively corresponding to the first conversation segments. The processor can also be configured to search the corpus of conversations to find second conversation segments having at least one of the question and answer structure patterns. For each of the question and answer structure patterns, the processor can be configured to receive labels associated with the second conversation segments. The processor can also be configured to compute effectiveness of each of the question and answer structure patterns based on the received labels. The processor can also be configured to select a question and answer structure pattern meeting an effectiveness threshold. The processor can also be configured to transform the selected question and answer structure pattern into a new question and answer.

A computer-implemented method, in an aspect, can include receiving a question and answer pair including a question and a corresponding answer. The method can also include searching a corpus of conversations to find first conversation segments containing the question and answer pair. The first conversation segments can contain statements including the question and the answer and intermediate statements in-between the question and the corresponding answer. The method can also include tagging the statements in the first conversation segments with dialog labels. For example, the first conversation segments can be transformed into sequences of dialog labels. A sequence of dialog labels can represent a question and answer structure pattern of a first conversation segment, where question and answer structure patterns are formed respectively corresponding to the first conversation segments. The method can also include searching the corpus of conversations to find second conversation segments having at least one of the question and answer structure patterns. The method can also include, for each of the question and answer structure patterns, receiving labels associated with the second conversation segments. The method can also include, based on the received labels, computing effectiveness of each of the question and answer structure patterns. The method can also include selecting a question and answer structure pattern meeting an effectiveness threshold. The method can also include transforming the selected question and answer structure pattern into a new question and answer.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Systems and methods can be provided, which can automatically identify, decompose, model and automate question and answer (QA) patterns and provide for fine-grained learning and orchestration at runtime. By way of example, customer care experience is one example area, where conversations are often composed of various goal-driven flow and add-on flow patterns. In one or more embodiments, systems and methods can discover QA pair structure patterns, which can support subject matter expert (SME) building QA knowledge from on-going large-scale conversations. The systems and methods in one or more embodiments can leverage existing QA knowledge to learn the typical structures of QA knowledge distribution in conversations, automatically discover new QA knowledge through the structure of learned QA knowledge distribution in conversations, and refine the structure of learned QA knowledge distribution by adding more semantics based on labeled data.

Figure 1:
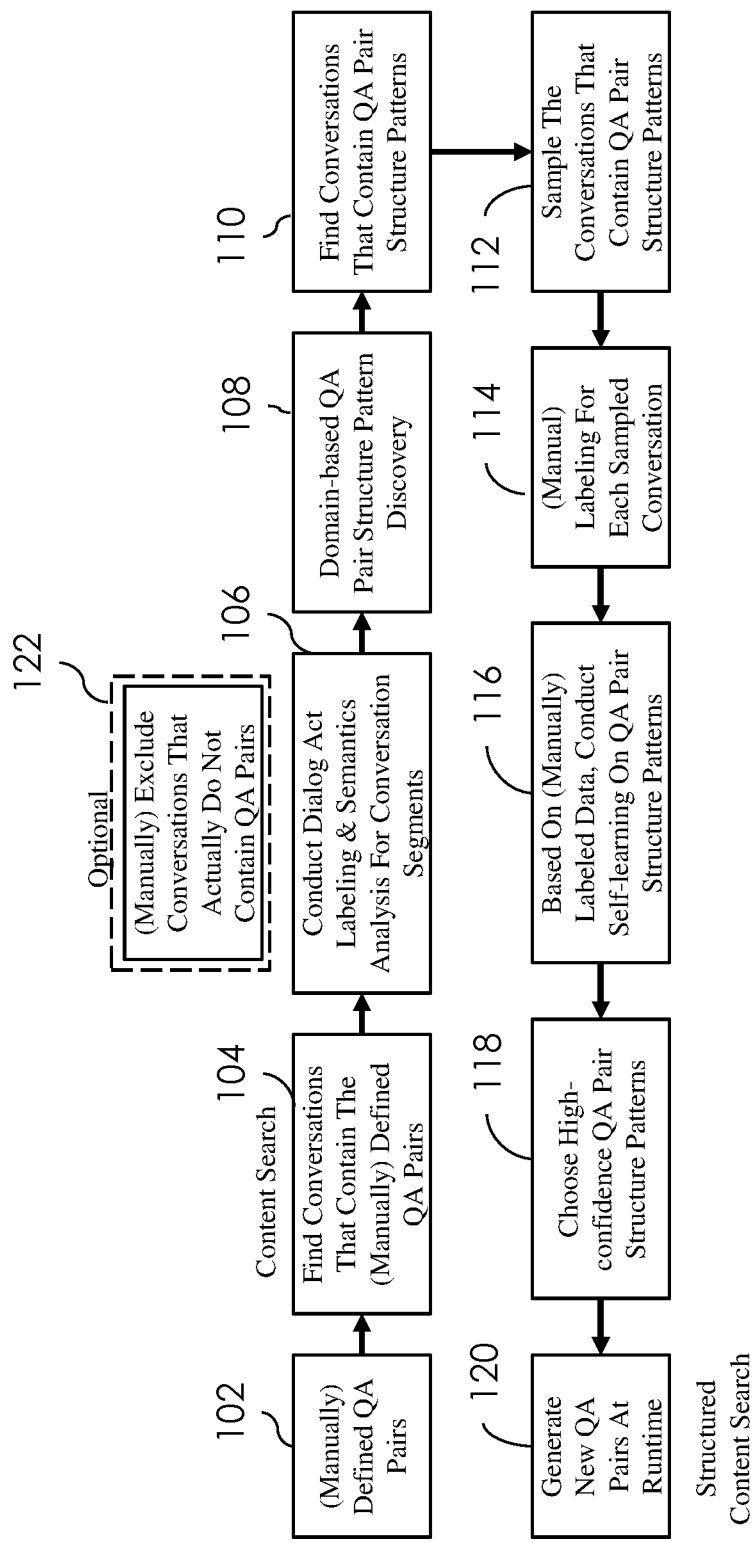
FIG. 1 is a flow diagram showing domain-based QA pair pattern discovery in an embodiment, for example, discovering a question and answer pair.

FIG. 1 is a flow diagram showing domain-based QA pair pattern discovery in an embodiment, for example, discovering a question and answer pair. The component shown can be implement and/or run on one or more computer processors, e.g., hardware processors. One or more hardware processors, for example, may include components such as programmable logic devices, microcontrollers, memory devices, and/or other hardware components, which may be configured to perform respective tasks described in the present disclosure. Coupled memory devices may be configured to selectively store instructions executable by one or more hardware processors.

A processor may be a central processing unit (CPU), a graphics processing unit (GPU), a field programmable gate array (FPGA), an application specific integrated circuit (ASIC), another suitable processing component or device, or one or more combinations thereof. The processor may be coupled with a memory device. The memory device may include random access memory (RAM), read-only memory (ROM) or another memory device, and may store data and/or processor instructions for implementing various functionalities associated with the methods and/or systems described herein. The processor may execute computer instructions stored in the memory or received from another computer device or medium.

In an embodiment, a conversation segment starts from an identified question utterance and ends at an answer utterance, include all dialog utterances between the question utterance and answer utterance. In an embodiment, an existing corpus of conversations or dialogs, for example switch board corpus or dialog corpus or data including dialogs, for example, question and answer type of conversations, which have been tagged can be used. For instance, existing databases may include labeled dialogs or utterances (e.g., referred to as dialog labels). For instance, Dialog Act Markup in Several Layers (DAMSL) is an example methodology, which includes annotated dialogs. By way of example, an existing dialog labeling methodology uses the following labels that annotate statements or utterances in a dialog to indicate the types of statements: statement-non-opinion (e.g., "me, I'm in the legal department"), acknowledge (backchannel) (e.g., "Uh-huh"), statement-opinion (e.g., "I think it's great"), agree/accept (e.g., "That's exactly it"), abandoned or turn-exit (e.g., "So, --"), appreciation (e.g., "I can imagine"), yes-no-question (e.g., "Do you have any special training?"), non-verbal (e.g., [Laughter], [Throat_clearing]), yes answer (e.g., "Yes"), conventional-closing (e.g., "Well, it's been nice talking to you"), uninterpretable (e.g., "But, uh, yeah", wh-question (e.g., "Well, how old is it?"), no answers (e.g., "No"), response acknowledgment (e.g., "Oh, okay"), hedge (e.g., "I don't know if I'm making any sense or not"), declarative yes-no-question (e.g., "So you can afford to get it?"), other (e.g., "Well, give me a break, you know"), backchannel in question form (e.g., "Is that right?"), quotation.

An example of a conversation or dialog can include a conversation or chat between a customer and an automated online customer service (e.g., a chatbot) for providing a service to the customer. For instance, a customer can type in or utter a question, and a chatbot can automatically answer the question or ask further questions, carrying on a dialog with the customer, in order to provide the answer. The chatbot, for example, can use natural language processing and machine learning techniques for conversing with the user. In an embodiment, a question and answer dialog can be discovered and saved for future use, for instance, in servicing a customer online. For instance, an automated processor or a robot may provide answers to a customer's questions on based on the discovered similar dialog.

Referring to FIG. 1, at 102, there can exist a corpus of pre-defined (e.g., manually defined) QA pairs, which can be used. For instance, one or more pre-defined QA pairs can be received.

At 104, content search is performed. For example, a processor can search a corpus or database of conversations or chats, to find a conversation that contains a pre-defined QA pair, for example, received at 102. This may be done for each of the pre-defined QA pairs in the corpus. For example, a conversation that contains a question and answer segment that is like the pre-defined QA pair can be identified. One or more natural language processing techniques can be used to find such conversations.

At 122, optionally, conversations that do not actually contain the QA pairs can be excluded, for example, manually. For instance, conversations segments or snippets identified or labeled as containing a QA pair may not actually have a question statement or answer statement. Such segments can be verified manually (e.g., by a user) and omitted.

At 106, a processor may perform labeling and semantic analysis of conversation segments in the conversation. For instance, sentences appearing between the question and answer like the QA pair, in the conversation can be labeled. For example, for each sentence, there can be one label such as a dialog act label or tag. A conversation segment containing the question and the answer, and one or more statements occurring in between the question and the answer can be labeled, forming a sequence of labels. For instance, a conversation segment is transformed into a sequence of labels, for example, dialog acts. A sequence of labels forms a domain-based QA pair structure pattern. There can be a plurality of such domain-base QA pair structure patterns, for example, since there can be different conversation segments which include the question and the answer. In an aspect, the labeling and analysis are domain-based, for example, pertains to a particular domain.

At 108, a processor may perform a domain-based QA pair structure pattern discovery. For example, a conversation segment containing a sequence of labels (e.g., a sequence of dialog acts) corresponding to the question and the answer, and in-between statements can be discovered. A sequence of labels for a conversation segment is also referred to as a QA pair structure pattern. There can be multiple different QA pair structure patterns.

At 110, a processor may search a conversation database or corpus containing the QA pair structure patterns, e.g., sequences of labels. For instance, the existing conversations are searched based on label patterns rather than their literary content.

At 112, a processor may sample the identified conversation segments that contain the sequence of labels to reduce the number of the identified conversation segments to a smaller set of conversation segments. In an embodiment, sampling can be performed by randomly selecting a subset of conversations that contain QA pair structure patterns, from the original whole set of conversations found at 110.

At 114, each sample conversation can be labeled. In an embodiment, this labeling can be done manually. For instance, a user or an agent may manually determine whether the sampled conversation contains a question and a corresponding answer. For example, given a conversation segment, a user or an agent may label whether that conversation segment contains a question and a corresponding answer, for example, in the form of at least one of the QA pair structure patterns. In an embodiment, manual labeling can be performed based on human judgment on whether a question and a corresponding answer appear in the sample conversation. When labeling, the user may find a question statement, and after that, look for a corresponding answer statement.

At 116, based on the labeled data, a processor may conduct self-learning on the QA pair structure patterns. This self-learning optimizes the result of pattern discovery and can rank the patterns. For example, based on the labeled data, the processor can compute effectiveness (e.g., an effectiveness score) associated with each of the QA pair structure patterns. This self-learning is described further with reference to FIG. 2.

At 118, a processor may select one or more QA pair structure patterns having a confidence score that is higher than a predefined threshold score. The predefined threshold score can be configurable.

At 120, for example, at run time of an online QA system, a processor may select the chosen QA pair structure pattern to generate a new QA pair. For example, a method disclosed herein can be enabled for an online conversation system, e.g., during a conversation conducted between a user and a customer support or service, and/or a chat application or the like running on a computer or a hardware processor. In an embodiment, a conversation carried on thusly can be checked to determine whether the conversation flow satisfies one or more of the identified QA pair structure patterns, and if yes, a QA pair identified in the conversation can be extracted and stored. For instance, question and answer from a conversation segment containing the chosen QA pair structure pattern, can be extracted. Such question and answer can be different from the question and answer received at 102, for instance, since the discovery is performed based on the QA pair structure pattern and not the literal content of the question. For instance, the generated new QA pair can be about a different subject or topic in the domain from the question and answer received at 102. The new QA pair can be stored, for example, for automatically conducting an online conversation with a user.

In an embodiment, the methodology disclosed herein can provide a powerful tool for the subject matter expert (SME) to handle large volume of data, for example, for QA discovery. Such a tool can be used to generated more effective and accurate online automated conversations which a machine such as a computer or an autobot (e.g., a robot) can carry on with a user.

Figure 2:
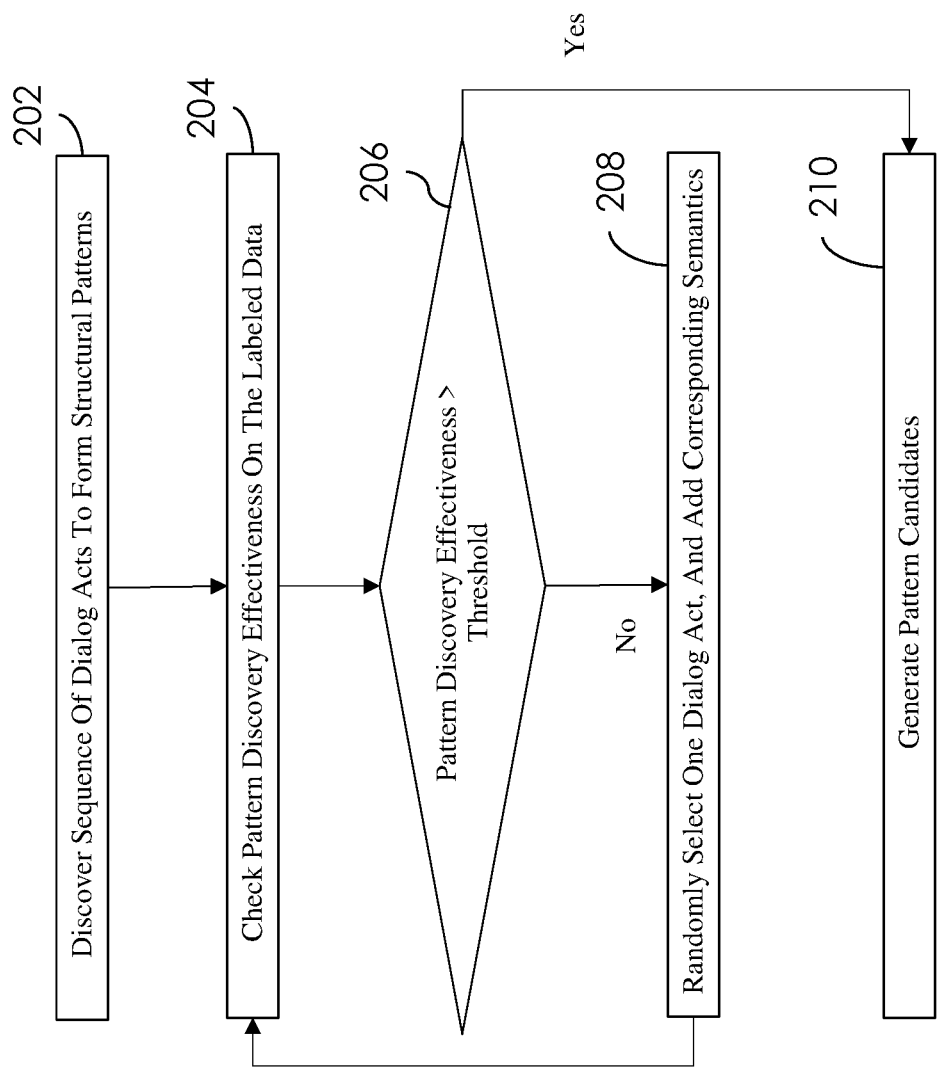
FIG. 2 is a flow diagram illustrating automatic refinement of dialog pattern in an embodiment.

FIG. 2 is a flow diagram illustrating automatic refinement of dialog pattern in an embodiment. The processor or flow shown in FIG. 2 can be run on or implemented by one or more computer processors, for example, including one or more hardware processors. At 202, a sequence of dialog labels or acts are discovered, e.g., a structural pattern of a conversation segment is discovered based on the labels of the statements in the conversation segment. For example, a frequent pattern of dialog acts or labels (based on a frequency threshold) can be discovered. For instance, one or more patterns that occur most frequently in conversations or based on a frequency threshold can be selected or identified.

At 204, pattern discovery effectiveness on the labeled data can be checked. A number of conversation segments can be labeled to indicate whether those conversation segments contain the structural pattern. For example, a user labeled conversation segments can be received. For instance, consider an example pattern P1 containing dialog labels or acts <a1, a2, a3, a4>, which occurs in conversations. Also consider another example pattern P2 containing dialog labels or acts <a3, a5, a6, a7>. Consider the following labeled conversations as applied to P1 pattern: C1(Y), C2(Y), C3(N), C4(Y). Out of the 4 conversation segments C1, C2, C3, and C4, a user labeled C1, C2 and C4 with "Y", indicating that those conversation segments contain the example pattern P1 with a question and a corresponding answer. In this example case, 3 out of 4 conversation segments are correctly identified as containing the question and answer, and hence the effectiveness or score is 3/4 or 0.75. Similarly, consider the following labeled conversations as applied to P2 pattern: C5(N), C6(N), C8(Y), C9(Y). In this example case, 2 out of 4 conversation segments are correctly identified as containing the question and answer, and hence the effectiveness or score associated with P2 pattern is 2/4 or 0.5.

If the threshold score is set to 0.7, then only P1 is selected. Such conversation pattern can be used in a real time online conversation in conversing with a user. The method at 204 also illustrates the self-learning and choosing high confidence QA pair structure pattern or patterns shown in FIG. 1 at 116 and 118.

For example, at 206, it is determined whether the pattern discovery effectiveness is greater than the threshold. If yes, then the pattern is generated as a candidate at 210. For example, consider that the threshold is 0.7. Considering the above P1 pattern as an example, and that the effectiveness of P1 pattern is computed to be 0.75, the P1 pattern is generated as a candidate pattern, for example, and saved for future use.

If the pattern discovery effectiveness is not greater than the threshold, further refining of the pattern can be performed. For instance, considering the above P2 pattern as an example, P2 can be further refined into P2' pattern. At 208, a dialog label or act can be randomly selected and a corresponding semantics can be added. For example, in the example pattern P2 containing dialog labels or acts <a3, a5, a6, a7>, a label can be selected randomly, e.g., <a5>, and using a natural language technique, semantics such as intent associated with the statement corresponding to <a5> label in a conversation (e.g., any one or more original conversation where the pattern was discovered), can be extracted, and added to the pattern. So for example, P2 is transformed or refined to P2', which includes <a3, <a5, intent1>, a6, a7>. In this example, only conversations having the pattern of <a3, <a5, intent1>, a6, a7> would be identified, e.g., C5(N), C8(Y), C9(Y). In this example, using the refined P2' pattern eliminated C6(N) from the above example conversations segments of P2 pattern: C5(N), C6(N), C8(Y), C9(Y), because C6 segment did not contain <a5, intent1>. In this example, at 204, the effectiveness of P2' is computed to be 2/3 (e.g., 2 out of 3 conversations have been correctly identified as relating to the question and answer pair). At 206, since 2/3 is still not greater than the threshold score in this example (e.g., 0.7), the processing can repeat again at 208.

For instance, P2' can be further transformed to P2" to include the semantics of another randomly selected dialog label, e.g., <a6> to contain its intent, <a6, intent2>. So for example, the transformed P2" can be <a3, <a5, intent1>, <a6, intent2>, a7>. Searching in C5(N), C8(Y), C9(Y) for the pattern P2" may further eliminate additional incorrectly identified conversation segment, e.g., C5(N), for instance, if C5(N) does not include <a6, intent2>. So in this example, pattern discovery effectiveness associated with P2" is computed to be 2/2, e.g., C8(Y), C9(Y). Since 2/2 is larger than 0.7, P2" can be generated as a pattern candidate at 210.

In an embodiment, <a3, <a5, intent1>, <a6, intent2>, a7> can be then stored or saved in a database of QA pairs and associated structures for future use.

Figure 3:
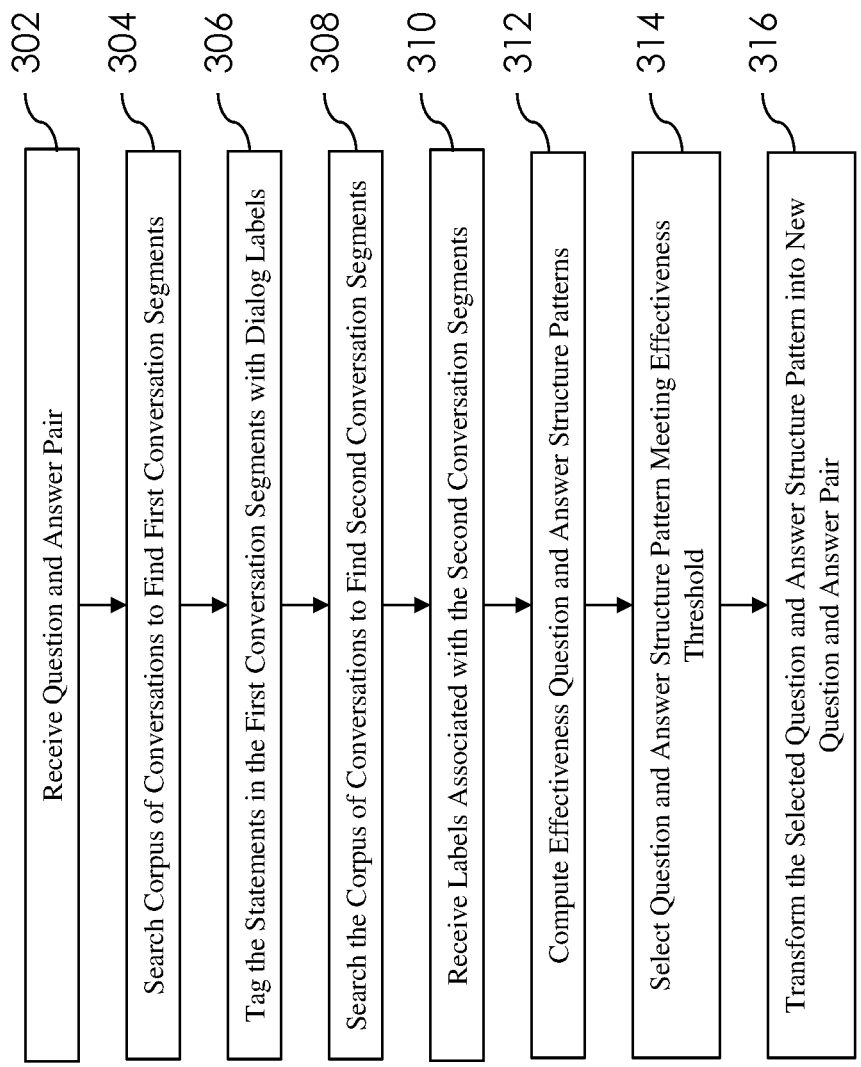
FIG. 3 is a flow diagram illustrating a method in an embodiment of discovering question and answer pair in conversations.

FIG. 3 is a flow diagram illustrating a method in an embodiment. The method can be performed or implemented on one or more computer processors, for example, including one or more hardware processors. At 302, a predefined question and answer can be received. Such a question and answer pair includes a question and a corresponding answer. A question and corresponding answer are also referred to as a question and answer (QA) pair. Such predefined question and answer pair can be retrieved from a corpus of existing QA pairs.

At 304, a corpus of conversations (e.g., a database of online chats, conversations and/or the like is searched to find first conversation segments containing the question and answer pair. The conversation segments contain statements or utterances including the question and the answer and intermediate statements in-between the question and the corresponding answer. For instance, a conversation can contain a question such as "Would length L fit size S?" and a corresponding answer such as "Size S is too small for length L." In between such question and answer in the conversation, e.g., after the question and before the answer is given, there can be one or more intermediate statements or utterances, which provide addition information for leading to the answer, e.g., "Is the width standard?", "no width is W", and/or others.

At 306, the statements in the first conversation segments are tagged or labeled with dialog labels. By tagging or labeling the statements, the first conversation segments can be transformed into sequences of dialog labels. For instance, a sequence of dialog labels represents a question and answer structure pattern of a first conversation segment. Question and answer (QA) structure patterns are formed respectively corresponding to the first conversation segments, for example, one QA structure pattern per one conversation segment.

At 308, the corpus of conversations is searched to find second conversation segments having at least one of the question and answer structure patterns. In an embodiment, the second conversation segments found in the search can be further sampled to reduce the number of the second conversation segments for processing.

At 310, for each of the question and answer structure patterns, labels or annotations associated with the second conversation segments are received. These labels or annotations indicate which one of the second conversation segments include a question and an answer sequence of statements that follow a question and answer structure patterns. In an embodiment, a conversation segment (e.g., a second conversation segment) has a corresponding label or annotation indicating whether that conversation segment follows a given question and answer structure pattern. The conversation segments are labeled or annotated based on each of the question and answer structure patterns. So, for example, if there are 5 different question and answer structure patterns, a conversation segment would be labeled 5 times, e.g., would have 5 labels or annotations. In an embodiment, the received labels or annotations are manually labeled labels or annotations, e.g., annotated by a user.

At 312, based on the received labels, effectiveness of each of the question and answer structure patterns is computed. For instance, for a question and answer structure pattern, an effectiveness score can be computed using the labels of the second conversation segments pertaining to that question and answer structure pattern. An example computation of such a score is described with reference to FIG. 2 at 204.

At 314, a question and answer structure pattern meeting an effectiveness threshold is selected. The effectiveness threshold can be configurable, and/or can be predefined.

At 316, the selected question and answer structure pattern is transformed into a new question and answer pair. For example, a conversation segment (second conversation segment) having the selected question and answer structure pattern is identified, and the question and answer in that identified conversation segment is extracted as a new question and answer pair.

In an embodiment, at least one of the question and answer structure patterns can be refined. For instance, a first conversation segment and/or a second conversation segment having a question and answer structure pattern can be further analyzed to determine an intent associated with one or more of the statements in the conversation segments. A natural language technique can be used to determine such intent or semantics associated with a statement or utterance. The determined intent can be added as associated with a dialog label corresponding to the statement having that intent, the dialog label which is contained in the question and answer structure pattern being refined. Example of such refinement is described with reference to FIG. 2. In an embodiment, a dialog label in the question and answer structure pattern being refined can be randomly selected as a candidate for adding intent to that dialog label (e.g., statement represented by that dialog label). In an embodiment, a question and answer structure pattern that does not meet the effectiveness threshold (e.g., at 314), or below the effectiveness threshold, can be selected for further refinement. In an embodiment, applying the refined question and answer structure pattern to one or more of the conversation segments can eliminate those that does not contain the refined question and answer structure pattern. For instance, a conversation segment previously identified as having the question and answer structure pattern may not contain the refined version of the question and answer structure pattern, and thus that conversation segment can be eliminated or excluded from consideration.

Figure 4:
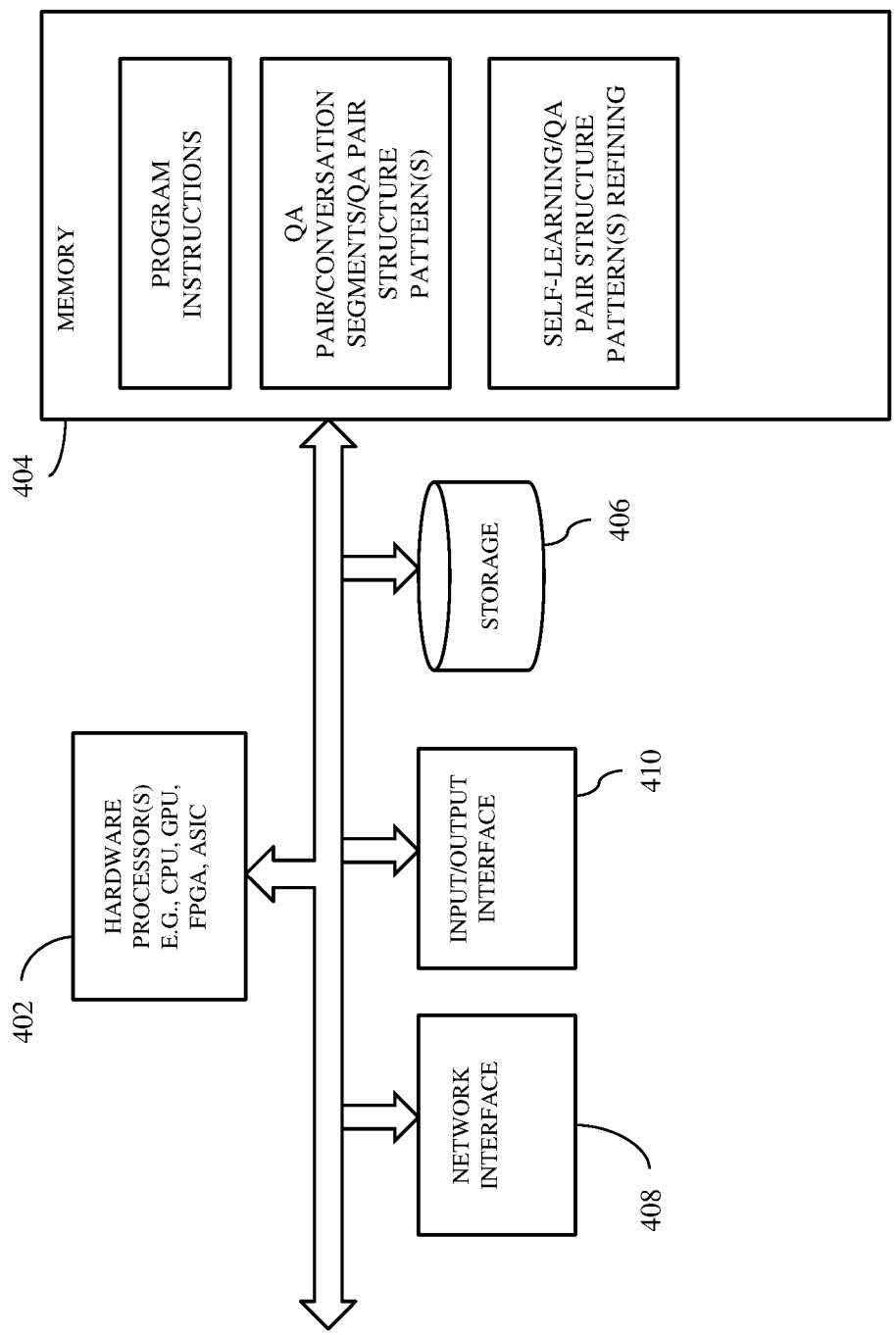
FIG. 4 is a diagram showing components of a system in one embodiment that discovers new question and answer (QA) knowledge from one or more conversations.

FIG. 4 is a diagram showing components of a system in one embodiment that discovers new question and answer (QA) knowledge from one or more conversations. One or more hardware processors 402 such as a central processing unit (CPU), a graphic process unit (GPU), and/or a Field Programmable Gate Array (FPGA), an application specific integrated circuit (ASIC), and/or another processor, may be coupled with a memory device 404, and generate a prediction model and recommend communication opportunities. A memory device 404 may include random access memory (RAM), read-only memory (ROM) or another memory device, and may store data and/or processor instructions for implementing various functionalities associated with the methods and/or systems described herein. One or more processors 402 may execute computer instructions stored in memory 404 or received from another computer device or medium. A memory device 404 may, for example, store instructions and/or data for functioning of one or more hardware processors 402, and may include an operating system and other program of instructions and/or data.

One or more hardware processors 402 may receive input including a question and answer (QA) pair. For example, a database or corpus of data including QA pairs, which have been predefined can be received, and used to discover a new QA pair. One or more processors may also receive or access a corpus of conversations such as online chats or other form of conversations. At least one hardware processor 402 may generate a new QA pair, for example, by using QA pair structure patterns identified in conversations. Data such as conversation data, predefined QA pairs, annotated conversation data may be stored in a storage device 406 or received via a network interface 408 from a remote device, and may be temporarily loaded into a memory device 404 for generating one or more QA structure patterns and new QA pair. One or more hardware processors 402 may be coupled with interface devices such as a network interface 408 for communicating with remote systems, for example, via a network, and an input/output interface 410 for communicating with input and/or output devices such as a keyboard, mouse, display, and/or others.

Figure 5:
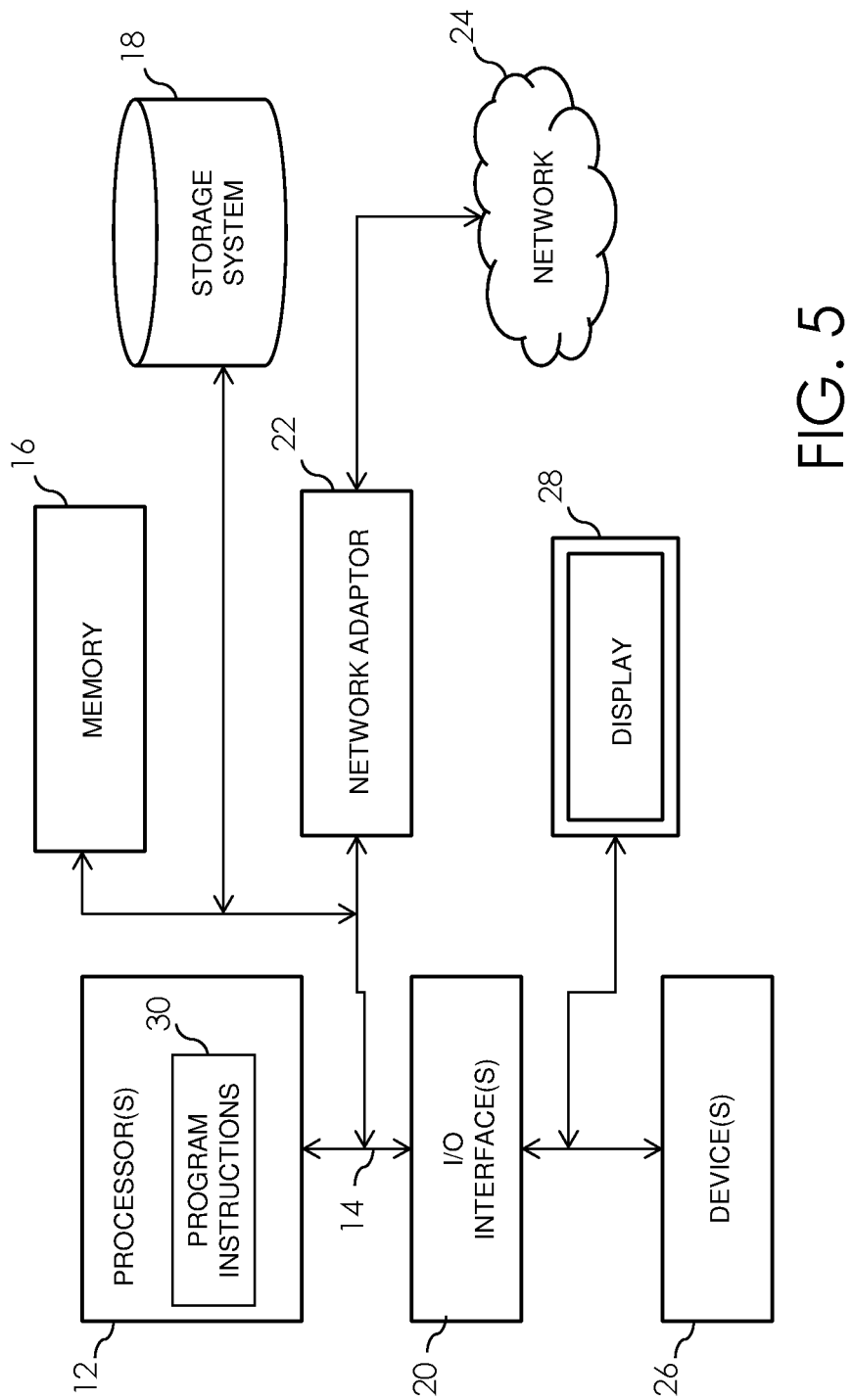
FIG. 5 illustrates a schematic of an example computer or processing system that may implement a system in one embodiment.

FIG. 5 illustrates a schematic of an example computer or processing system that may implement a system in one embodiment. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 5 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being run by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
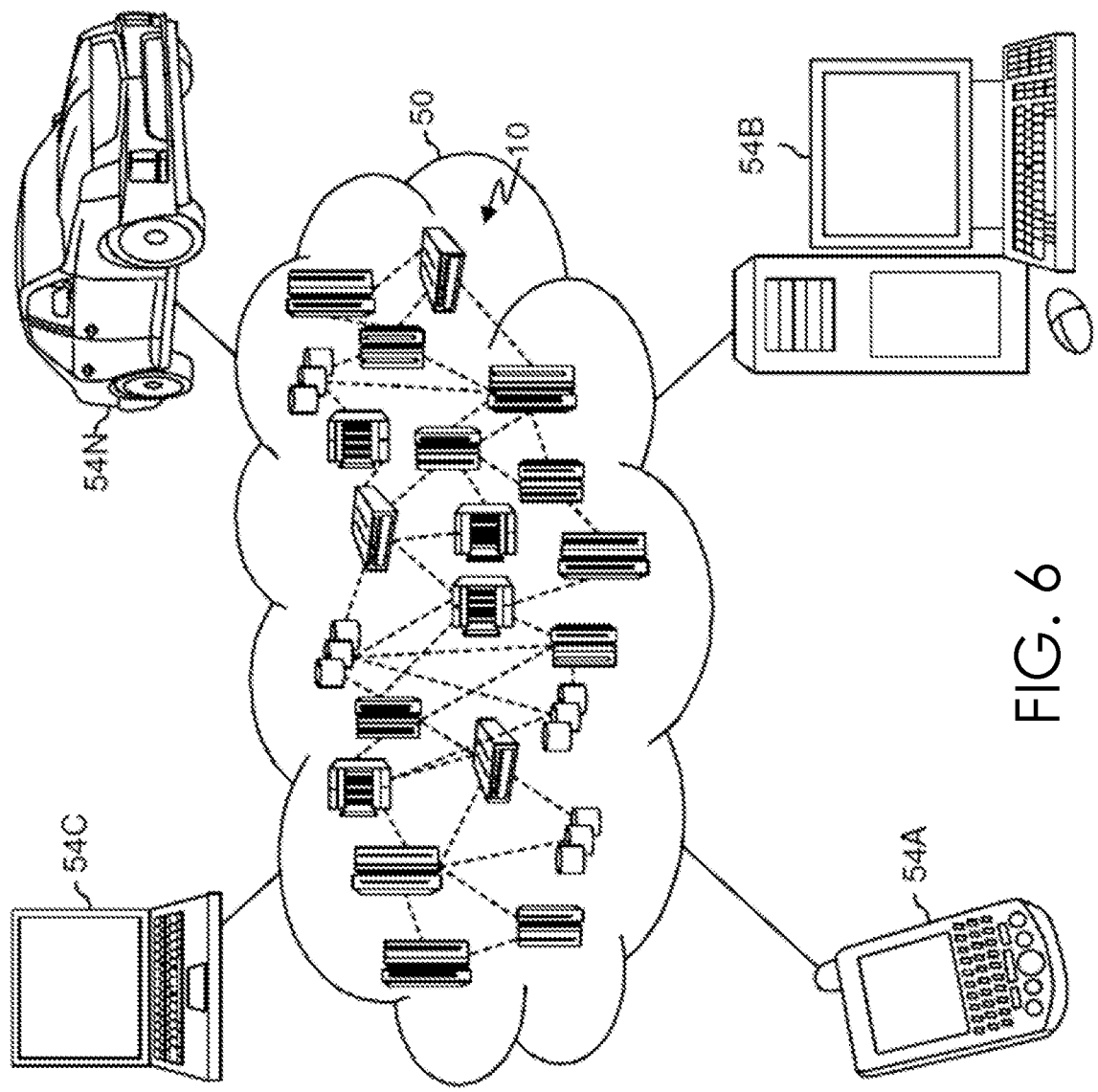
FIG. 6 illustrates a cloud computing environment in one embodiment.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
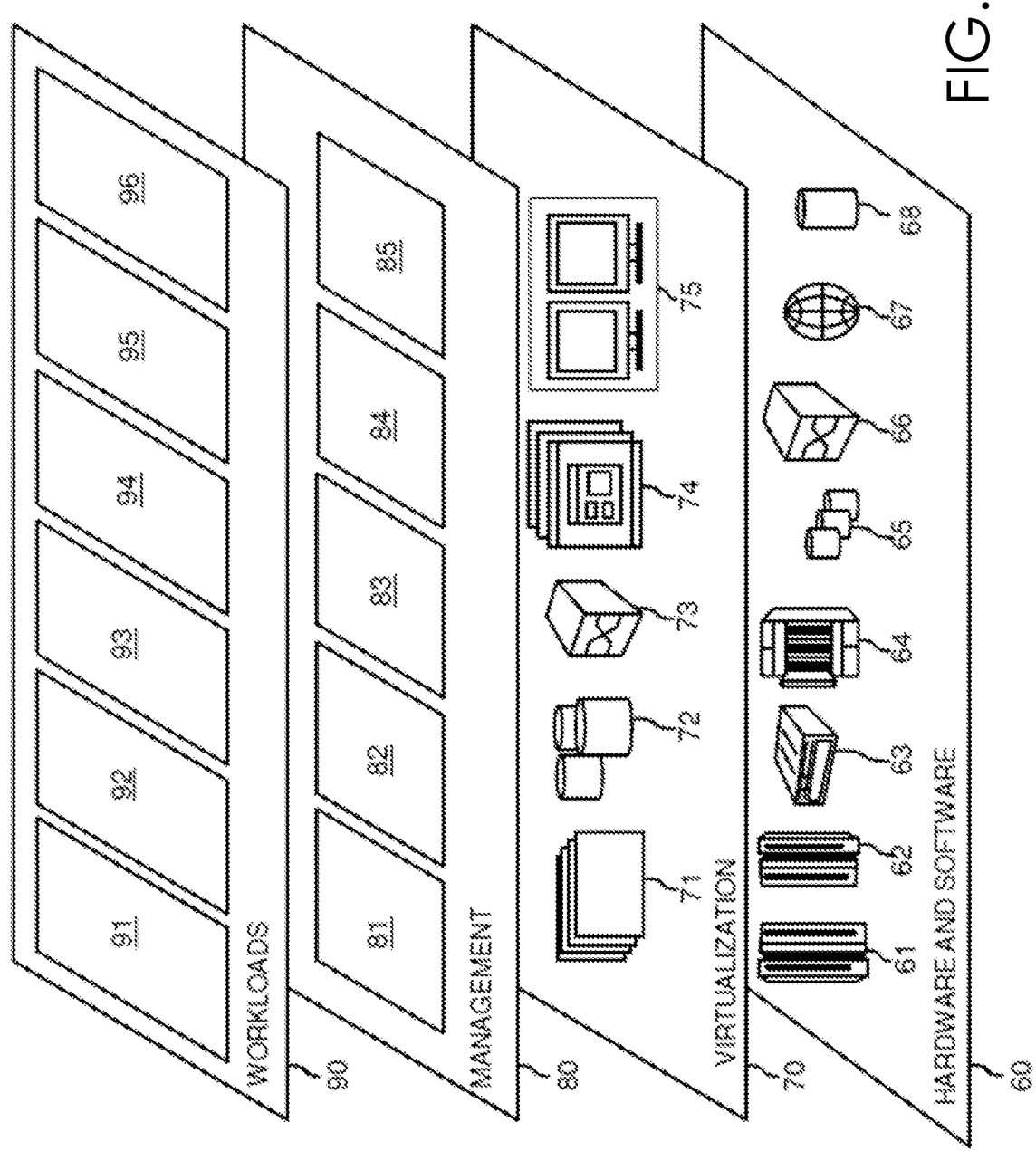
FIG. 7 illustrates a set of functional abstraction layers provided by cloud computing environment in one embodiment of the present disclosure.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and QA discovery processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, run concurrently, substantially concurrently, in a partially or wholly temporally overlapping manner, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, the term "or" is an inclusive operator and can mean "and/or", unless the context explicitly or clearly indicates otherwise. It will be further understood that the terms "comprise", "comprises", "comprising", "include", "includes", "including", and/or "having," when used herein, can specify the presence of stated features, integers, steps, operations, elements, and/or components, but do not preclude the presence or addition of one or more other features, integers, steps, operations, elements, components, and/or groups thereof. As used herein, the phrase "in an embodiment" does not necessarily refer to the same embodiment, although it may. As used herein, the phrase "in one embodiment" does not necessarily refer to the same embodiment, although it may. As used herein, the phrase "in another embodiment" does not necessarily refer to a different embodiment, although it may. Further, embodiments and/or components of embodiments can be freely combined with each other unless they are mutually exclusive.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system comprising:
   a processor; and
   a memory device coupled with the processor;
   the processor configured to, in performing operations of a chatbot having an on-line interactive chat conversation:
   receive a question and answer pair including a question and a corresponding answer;
   search a corpus of conversations to find first conversation segments containing the question and answer pair, the first conversation segments containing statements including the question and the corresponding answer, and intermediate statements in-between the question and the corresponding answer;
   tag the statements in the first conversation segments with dialog labels, the first conversation segments transformed into sequences of dialog labels, a sequence of dialog labels representing a question and answer structure pattern of a first conversation segment, wherein question and answer structure patterns are formed respectively corresponding to the first conversation segments;
   search the corpus of conversations to find second conversation segments having at least one of the question and answer structure patterns;
   for each of the question and answer structure patterns, receive labels associated with the second conversation segments;
   based on the received labels, compute effectiveness of each of the question and answer structure patterns;
   select a question and answer structure pattern meeting an effectiveness threshold;
   transform the selected question and answer structure pattern into a new question and answer; and
   conduct on-line chatbot conversation incorporating the new question and answer.

2. The system of claim 1, wherein the processor is further configured to sample the second conversation segments found in the search to reduce the number of the second conversation segments for processing.

3. The system of claim 1, wherein the received labels are manually labeled labels, indicating which of the second conversation segments include statements that follow the question and answer structure patterns.

4. The system of claim 1, wherein the processor is further configured to refine at least one of the question and answer structure patterns by further analyzing at least one of the first conversation segment and the second conversation segment having said at least one of the question and answer structure patterns, and adding an intent associated with a dialog label contained in said at least one of the question and answer structure patterns.

5. The system of claim 4, wherein the dialog label is randomly selected for adding the intent.

6. The system of claim 4, wherein the processor is configured to refine said at least one of the question and answer structure patterns, which is below the effectiveness threshold.

7. The system of claim 6, wherein the refined question and answer structure pattern eliminates at least one labeled conversation segment having said at least one of the question and answer structure patterns.

8. The system of claim 1, wherein the received question and answer pair includes a predefined question and answer pair retrieved from a database storing manually defined question and answer pairs.

9. A computer-implemented method comprising:
   receiving a question and answer pair including a question and a corresponding answer in performing operations of a chatbot having an on-line interactive chat conversation;
   searching a corpus of conversations to find first conversation segments containing the question and answer pair, the first conversation segments containing statements including the question and the corresponding answer and intermediate statements in-between the question and the corresponding answer;
   tagging the statements in the first conversation segments with dialog labels, the first conversation segments transformed into sequences of dialog labels, a sequence of dialog labels representing a question and answer structure pattern of a first conversation segment, wherein question and answer structure patterns are formed respectively corresponding to the first conversation segments;
   searching the corpus of conversations to find second conversation segments having at least one of the question and answer structure patterns;

for each of the question and answer structure patterns, receiving labels associated with the second conversation segments;

based on the received labels, computing effectiveness of each of the question and answer structure patterns;

selecting a question and answer structure pattern meeting an effectiveness threshold; and transforming the selected question and answer structure pattern into a new question and answer; and conducting on-line chatbot conversation incorporating the new question and answer.

10. The method of claim 9, further including sampling the second conversation segments found in the search to reduce the number of the second conversation segments for processing.

11. The method of claim 9, wherein the received labels are manually labeled labels, indicating which of the second conversation segments include statements that follow the question and answer structure patterns.

12. The method of claim 9, further including refining at least one of the question and answer structure patterns by further analyzing at least one of the first conversation segment and the second conversation segment having said at least one of the question and answer structure patterns, and adding an intent associated with a dialog label contained in said at least one of the question and answer structure patterns.

13. The method of claim 12, wherein the dialog label is randomly selected for adding the intent.

14. The method of claim 12, wherein the refining includes refining said at least one of the question and answer structure patterns, which is below the effectiveness threshold.

15. The method of claim 14, wherein the refined question and answer structure pattern eliminates at least one labeled conversation segment having said at least one of the question and answer structure patterns.

16. A computer program product comprising a computer readable storage medium having program instructions embodied therewith, the program instructions readable by a device to cause the device to:

receive a question and answer pair including a question and a corresponding answer in performing operations of a chatbot having an on-line interactive chat conversation;

search a corpus of conversations to find first conversation segments containing the question and answer pair, the conversation segments containing statements including the question and the answer and intermediate statements in-between the question and the corresponding answer;

tag the statements in the first conversation segments with dialog labels, the first conversation segments transformed into sequences of dialog labels, a sequence of dialog labels representing a question and answer structure pattern of a first conversation segment, wherein question and answer structure patterns are formed respectively corresponding to the first conversation segments;

search the corpus of conversations to find second conversation segments having at least one of the question and answer structure patterns;

for each of the question and answer structure patterns, receive labels associated with the second conversation segments;

based on the received labels, compute effectiveness of each of the question and answer structure patterns;

select a one question and answer structure pattern meeting an effectiveness threshold;

transform the selected question and answer structure pattern into a new question and answer; and conduct on-line chatbot conversation by a chatbot incorporating the new question and answer.

17. The computer program product of claim 16, wherein the processor is further configured to sample the second conversation segments found in the search to reduce the number of the second conversation segments for processing.

18. The computer program product of claim 16, wherein the received labels are manually labeled labels, indicating which of the second conversation segments include statements that follow the question and answer structure patterns.

19. The computer program product of claim 16, wherein the processor is further configured to refine at least one of the question and answer structure patterns by further analyzing at least one of the first conversation segment and the second conversation segment having said at least one of the question and answer structure patterns, and adding an intent associated with a dialog label contained in said at least one of the question and answer structure patterns.

20. The computer program product of claim 19, wherein the dialog label is randomly selected for adding the intent.

* * * * *